United States Patent [19]

Maier

[11] Patent Number: 4,908,783
[45] Date of Patent: Mar. 13, 1990

[54] APPARATUS AND METHOD FOR DETERMINING LIQUID LEVELS

[75] Inventor: Lawrence C. Maier, Middlebury, Vt.

[73] Assignee: Simmonds Precision Products, Inc., Wilmington, Del.

[21] Appl. No.: 43,500

[22] Filed: Apr. 28, 1987

[51] Int. Cl.⁴ .................. G06F 15/20; G01F 23/00
[52] U.S. Cl. .................. 364/560; 73/290 R; 73/304 R; 73/861.08; 324/71.1; 340/618; 364/509; 364/550
[58] Field of Search ............... 364/509, 560, 566, 550; 340/936, 971, 612, 618; 324/71.1, 61 R; 73/290 R, 304 R, 304 C, 861.08

[56] References Cited

U.S. PATENT DOCUMENTS

| | | | |
|---|---|---|---|
| 4,083,248 | 4/1978 | Maier | 73/304 C |
| 4,090,408 | 5/1978 | Hedrick | 73/304 C |
| 4,181,958 | 1/1980 | Juengel et al. | 364/560 |
| 4,258,422 | 3/1981 | Dougherty et al. | 364/509 |
| 4,352,159 | 9/1982 | Colby | 364/509 |
| 4,355,363 | 10/1982 | Colby et al. | 73/290 R |
| 4,373,390 | 2/1983 | Van Dyke et al. | 73/304 C |
| 4,382,382 | 5/1983 | Wang | 73/304 R |
| 4,388,828 | 6/1983 | Dougherty | 73/304 C |
| 4,425,795 | 1/1984 | Albrecht et al. | 364/509 |
| 4,437,162 | 3/1984 | Kato | 364/509 |
| 4,441,157 | 4/1984 | Gerchman et al. | 364/509 |
| 4,451,894 | 5/1984 | Dougherty et al. | 364/509 |
| 4,545,020 | 10/1985 | Brasfield | 364/509 |
| 4,583,402 | 4/1986 | Myers et al. | 73/304 R |
| 4,589,077 | 5/1986 | Pope | 364/509 |
| 4,731,730 | 3/1988 | Hedrick et al. | 73/290 R |

*Primary Examiner*—Parshotam S. Lall
*Assistant Examiner*—Kevin J. Teska
*Attorney, Agent, or Firm*—Dale R. Lovercheck

[57] ABSTRACT

A liquid level sensor system well suited for sensing the level of fuel in aircraft fuel tanks includes a plurality of capacitive sensors which provide an output capacitance that is a function of the fraction of the sensor wetted by the fuel. A plurality of sensors are positioned in the liquid-containing tank with each sensor having a first and at least a second probe-specific liquid-quantity profile corresponding to a first and at least a second attitude of the tank. The capacitance of the sensors are determined as function of the length of the respective sensor wetted by the liquid. A memory is provided with a first and second sets of address locations containing liquid-quantity profile information for the sensors for their respective first and second attitudes. The memory is addressed by determining an address offset as a function of the attitude of the system, the relative location of the profile information for the sensor, and the fraction of the sensor wetted by the liquid.

4 Claims, 3 Drawing Sheets

| ADDRESS (DEC) | QUANTITY (GAL) |
|---|---|
| 0000 | 0 |
| 0001 | 5 |
| 0002 | 10 |
| 0003 | 15 |
| 0004 | 20 |
| 0005 | 0 |
| 0006 | 2 |
| 0007 | 4 |
| 0008 | 8 |
| 0009 | 16 |
| 0010 | 0 |
| 0011 | 1 |
| 0012 | 2 |
| 0013 | 3 |
| 0014 | 6 |
| 0015 | 0 |
| 0016 | 8 |
| 0017 | 13 |
| 0018 | 18 |
| 0019 | 23 |
| 0020 | 0 |
| 0021 | 4 |
| 0022 | 6 |
| 0023 | 10 |
| 0024 | 18 |
| 0025 | 0 |
| 0026 | 1 |
| 0027 | 3 |
| 0028 | 6 |
| 0029 | 12 |

FIG. 2

APPARATUS AND METHOD FOR DETERMINING LIQUID LEVELS

CROSS REFERENCE TO RELATED APPLICATIONS

The subject matter of the present application is related to that disclosed in applicant's co-pending and commonly assigned U.S. Pat. Application Ser. No. 07/042,229, filed Apr. 24, 1987 and entitled "Apparatus and Method for Determining Resistive and Capacitive Values," the disclosure of which is incorporated herein by reference.

BACKGROUND OF THE INVENTION

The present invention relates to apparatus and method for evaluating the output of a sensor and providing an indication of a measured parameter as a function of the sensor output. More particularly, the present invention relates to the sensing of liquid quantities in a tank using liquid level sensors and providing an indication of the quantity of liquid in the tank as a function of the sensor output.

In sensing the level of a liquid in a container, such as fuel in aircraft wing and fuselage tanks, a plurality of capacitive sensors are mounted in the tanks and the output of the sensors used to provide an indication of the fuel level. In general, the capacitive sensors are formed as concentric, elongated cylinders that function as capacitor plates with the dielectric constant and the capacitance of the sensor varying as a function of the fraction of the sensor wetted by the fuel and the unwetted fraction in the airspace above the fuel/air interface. Capacitor type sensors can be provided with linear characteristics in which the capacitance varies with the fraction of the sensor that is wetted. However, sensors with linear sensing characteristics cannot account for irregularly shaped fuel tanks typically used in aircraft in which the change in quantity of fuel with height is non-linear and can oftentimes vary in a manner approximating a discontinuous, step-wise function. In addition, the attitude of the aircraft fuel tank, for example, whether the aircraft is in level flight with a slight nose-up pitch or on the ground with a slight nose-down pitch, can adversely affect the accuracy of any sensor output.

Various sensor systems have been used to evaluate the output of a fuel level sensor or sensors and provide a corresponding indication of fuel level output. For example, analog systems can introduce various electrical offsets and constants to provide an output that follows a predetermined function to provide fuel quantity information. Additionally, digital systems can digitize the output of the sensors to provide binary data words that can be manipulated arithmetically to provide fuel quantity information. Where the particular shape of the fuel tank or tank system is such that a sensor output that is linear with length is non-representative of fuel quantity, a memory look-up table can be provided in which the sensor output is digitized and forms the basis of a memory address that addresses specific locations in a memory to provide corresponding fuel quantity information. The digitized sensor output, while suitable for addressing a memory look-up table in some situations, is not entirely suitable in situations where a change in sensor attitude relative to the fuel level can provide a sensor output that is no longer representative of fuel level or fuel quantity.

SUMMARY OF THE INVENTION

In view of the above, it is an object of the present invention, among others, to provide apparatus and method for utilizing the digitized output of a liquid level sensor to address a memory to obtain corresponding information relating to the level of liquid sensed or the quantity of liquid in a container.

It is another object of the present invention to provide apparatus and method for utilizing the digitized output of a liquid level sensor to address a memory to obtain corresponding information relating to the level of liquid where the sensor is positionable in one of several attitudes relative to the liquid.

It is still another object of the present invention to provide a fuel level sensor system using fuel sensor probes that provide an analog output with fuel level and using that analog level to assist in addressing a digital memory to obtain fuel level information.

In view of these objects, and others, the present invention provides a liquid level sensor system well suited for sensing the level of fuel in aircraft fuel tanks having a plurality of capacitive type sensors that provide an output capacitance that is a function of the liquid level. A plurality of sensors are positioned in the liquid-containing tank with each sensor having a first and at least a second sensor-specific liquid-quantity profile corresponding to a first and at least a second condition, such as attitude of the tank. The capacitance of the sensors are determined as function of the fraction of the overall length of the respective sensor wetted by the liquid. A memory is provided with a first and second set of address locations containing liquid-quantity profile information for the sensors for their respective first and second conditions. The memory is addressed by determining an address offset as a function of the condition of the system, the relative location of the profile information for the sensor, and the fraction of the sensor wetted by the liquid.

The present invention provides method and apparatus that advantageously determines liquid levels or liquid quantities in a liquid containing tank where the relationship between liquid level and liquid quantity is non-linear and/or of a discontinuous nature and where the attitude of the liquid containing tank can vary relative to the gravity vector.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 2 is an illustrative representation of the memory topology of the memory of FIG. 1 in which the left column represents an address (in decimal) and the right column represents stored liquid quantity information.

DESCRIPTION OF THE PREFERRED EMBODIMENT

Figure 1:
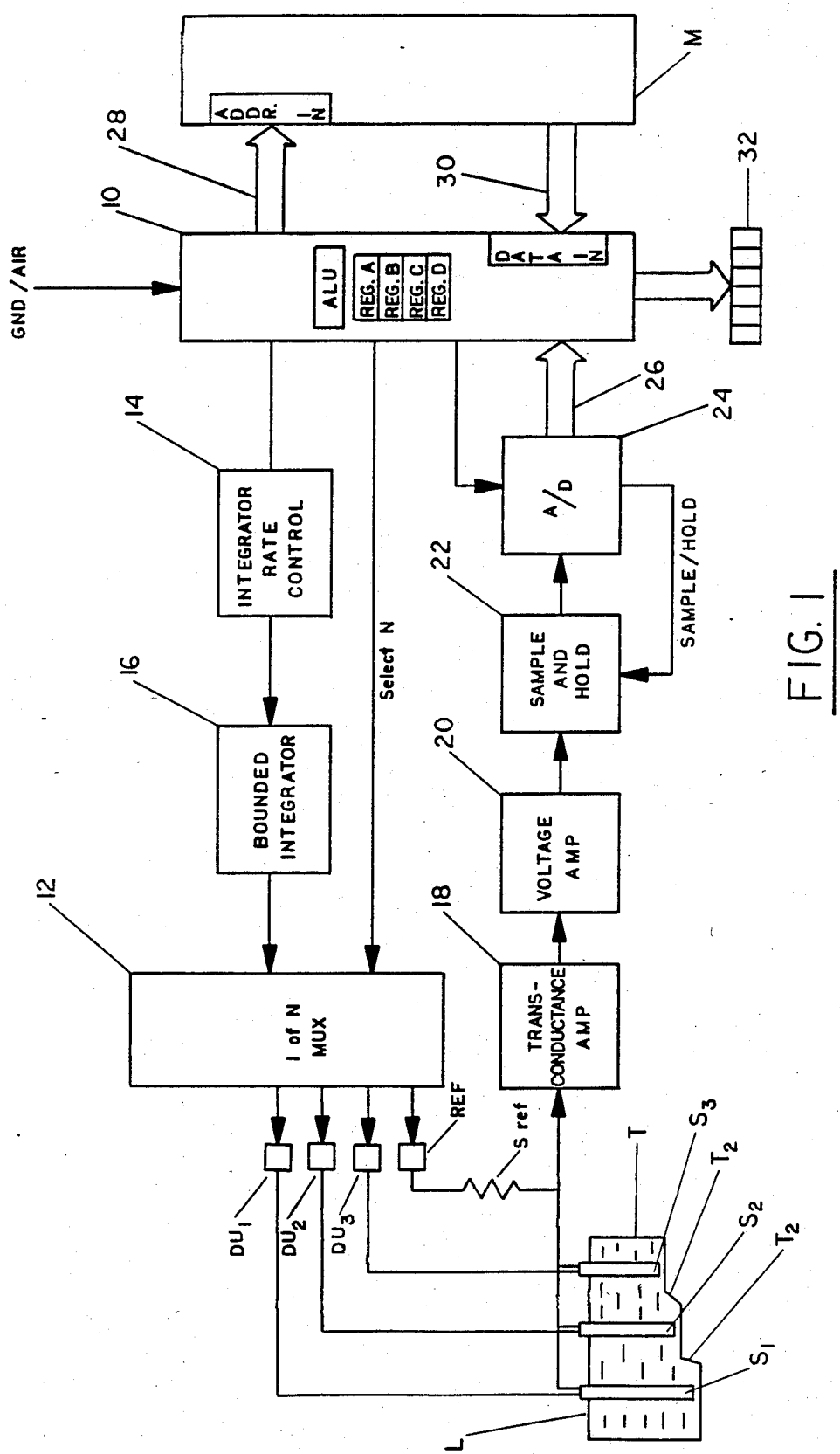
FIG. 1 is a schematic block diagram of a liquid level sensing system in accordance with the present invention including a microprocessor addressed memory.

A preferred embodiment of the present invention is shown in FIG. 1 and includes, as shown, a system control and processing unit 10 which provides output control signals to a one-of-N multiplexer 12 and an integrator rate controller 14, which, in turn, provides rate control signals to a bounded integrator 16. The bounded integrator 16 provides symmetrical voltage limits of opposite polarity, for example, of +10 and −10 VDC, with the rate of change of the output between these two limits controlled by the integrator rate controller 14 under instruction from the system control and processing unit 10 to provide an interrogation waveform as described in accordance with the above-incorporated patent application. The multiplexer 12 is of a 1-of-N type under the control of the system control and processing unit 10 and provides the voltage output of the bounded integrator 16 to a selected one of the N output lines. A reference driver unit REF and a plurality of driver units $DU_1 \ldots DU_n$, of which only $DU_1$, $D_2$, and $D_3$ are illustrated, are connected to the various output lines of the multiplexer 12. The reference driver unit REF is connected to a sensor reference $S_{ref}$ having a predetermined or otherwise known resistance characteristic $R_{ref}$, and the various driver units $DU_1 \ldots DU_3$ are connected to respective sensor probes $S_1 \ldots S_3$.

The sensor probes $S_1 \ldots S_3$ are shown immersed in a liquid L contained in a tank T having an irregular cross-section to illustrate the manner by which non-linearities are introduced into the output of a sensor probe having generally linear response characteristics. The irregular cross section of the tank T includes a first, vertical step $T_1$ in the bottom wall of the tank T between the sensor probes $S_1$ and $S_2$ and a second, inclined ramp surface $T_2$ between the sensor probes $S_2$ and $S_3$. In the preferred embodiment, the sensor probes $S_1 \ldots S_3$ are used to determine fuel quantities in one or more aircraft fuel tanks, which typically have irregular shapes and different attitudes relative to the gravity vector depending upon whether the aircraft is in flight or on the ground.

Each of the sensor probes $S_n$ has capacitive and resistive characteristics that vary as a function of a to-be-measured environmental characteristics. For example, the sensor probes $S_n$ can be formed as concentric cylindrical capacitive elements in which the capacitance varies in a generally linear manner as a function of the fraction of the sensor probe $S_n$ that is wetted by the liquid between the capacitive elements. While the various sensor probes $S_1 \ldots S_3$ have a generally linear output characteristic with rising liquid L level, the irregularities in the tank T shape can introduce irregularities in the output of the sensor probes $S_1 \ldots S_3$, as explained below.

The various sensor probes $S_n$ are connected in common circuit with one another and the input of a transconductance amplifier 18 which converts the current flow of a selected sensor probe $S_n$ or the sensor reference $S_{ref}$ to a voltage for amplification by a voltage amplifier 20. A sample and hold circuit 22 accepts the output of the voltage amplifier 20 at selected times during the application of the voltage waveform provided through the multiplexer 12 from the bounded integrator 16. An analog-to-digital converter 24 accepts, under the control of the system control and processing unit 10, the output of the sample and hold circuit 22 and provides a corresponding binary value along a data bus 26 to an input of the system control and processing unit 10.

The system control and processing unit 10 includes an arithmetic and logic unit ALU as well as various instruction and data registers for carrying out the liquid level quantity determinations as described below. Additionally, the system control and processing unit 10 is connected to a memory, characterized in general form by the reference character M, which includes a plurality of addressable memory locations containing liquid quantity information, as explained more fully below in relation to FIG. 2. The memory M includes an address input port that receives address information from the system control and processing unit 10 through an address bus 28 and provides the addressed data along a data bus 30 to a data input port of the system control and processing unit 10. While the memory M has been shown as a separate functional block from the system control and processing unit 10, the memory M can be combined with the system control and processing unit 10 as an integrated circuit.

An output device 32, which may take the form of a multi-digit BCD display, is connected to the system control and processing unit 10 and provides an indication of the liquid level output. While not shown, the output device may also take the form of a printer to provide a hard copy output.

The irregular shape of the exemplary tank T shown in FIG. 1 introduces discontinuities and non-linearities in the output of the various sensor probes $S_n$ depending upon their relative location. For example, the sensor probe $S_1$ will provide a relatively linear output with a rising level of the liquid L from the lowermost portion of the tank T bottom until the level of the liquid L attains and surmounts the step $T_1$ after which the output of the sensor probe $S_1$ will change in a discontinuous or near discontinuous manner to another relationship relative to the rising liquid L level. In contrast to the sensor probe $S_1$, the sensor probe $S_2$ will provide a non-linear output with rising liquid L because of the inclined ramp surface $T_2$ until the liquid L attains and surmounts the ramp surface $T_2$ after which the output will be essentially linear. Lastly, the output of the sensor probe $S_3$ will be essentially linear with rising liquid level through its entire operating length. As can be appreciated, the output of the sensor probes $S_n$ and the relative linearity or non-linearity will be altered by a change in attitude of the tank T. In the context of an aircraft fuel tank, the output of the sensor probes $S_n$ will change depending upon whether the aircraft is in a first attitude, e.g., level flight with a slight nose-up pitch or in a second attitude, e.g., on the ground with a slight nose-down pitch.

The embodiment of FIG. 1 operates to selectively poll the sensor reference $S_{ref}$ and the various sensor probes $S_n$. For example, the system control and processing unit 10 controls the multiplexer 12 to select the sensor reference $S_{ref}$ and controls the bounded integrator 16 to provide an interrogation voltage waveform, as described in the above-incorporated application, through the reference driver unit REF to the sensor reference $S_{ref}$. The current drawn through the sensor reference $S_{ref}$ is converted by the transconductance amplifier 18 to a voltage which, in amplified form through the voltage amplifier 20, is provided to the sample and hold circuit 22 for conversion to a binary value and presentation to the system control and processing unit 10. In a similar manner, the sensor probes $S_1 \ldots S_3$ are likewise interrogated to provide the system control and processing unit 10 with information indicating the fraction (e.g., 0.85) of the particular sensor probe $S_n$ wetted by the liquid L.

As shown in FIG. 2, the memory M of FIG. 1 is illustrated as having thirty contiguous addressable memory locations 0000 to 0029 (decimal) with a first set of fifteen memory locations 0000 to 0014 containing three groups of five memory locations for the sensor probes $S_1$, $S_2$, and $S_3$, and a second set of fifteen memory locations 0015 to 0029 defining an additional three groups of five memory locations for the sensor probes $S_1$, $S_2$, and $S_3$. The first set of memory locations 0000 to 0014 contains fuel quantity information for the sensor probes $S_1$, $S_2$, and $S_3$ when the tank T is in a first attitude corresponding to, for example, the aircraft in an on-the-ground attitude, and the second set of memory locations contains fuel quantity information for the sensor probes $S_1$, $S_2$, and $S_3$ when the tank T is in a second attitude corresponding to the aircraft in flight. The three groups of memory locations in the first set, addresses 0000 to 0014, include address group 0000 to 0004 containing corresponding fuel quantity information for the first sensor $S_1$ in the first attitude, address group 0005 to 0009 containing corresponding fuel quantity information for the second sensor $S_2$ in the first attitude, and address group 0010 to 0014 containing corresponding fuel quantity information for the third sensor $S_3$, also in the first attitude. In an analogous manner, the three groups of memory locations in the second set, addresses 0015 to 0029, include address group 0015 to 0019 containing corresponding fuel quantity information for the first sensor $S_1$ in the second attitude, address group 0020 to 0024 containing corresponding fuel quantity information for the second sensor $S_2$ in the second attitude, and address group 0025 to 0029 containing corresponding fuel quantity information for the third sensor $S_3$, also in the second attitude. In the disclosed embodiment, the addresses within each group are sequential; however, the stored fuel quantity information is generally not linear with the sequentially increasing addresses and preferably follows the non-linearity or discontinuity of the particular tank T configuration, as represented, for example, in address locations 0025 to 0029.

The memory topology presented in FIG. 2 is for the purpose of illustration only and actual memory addressing is typically accomplished in hexadecimal.

Figure 3:
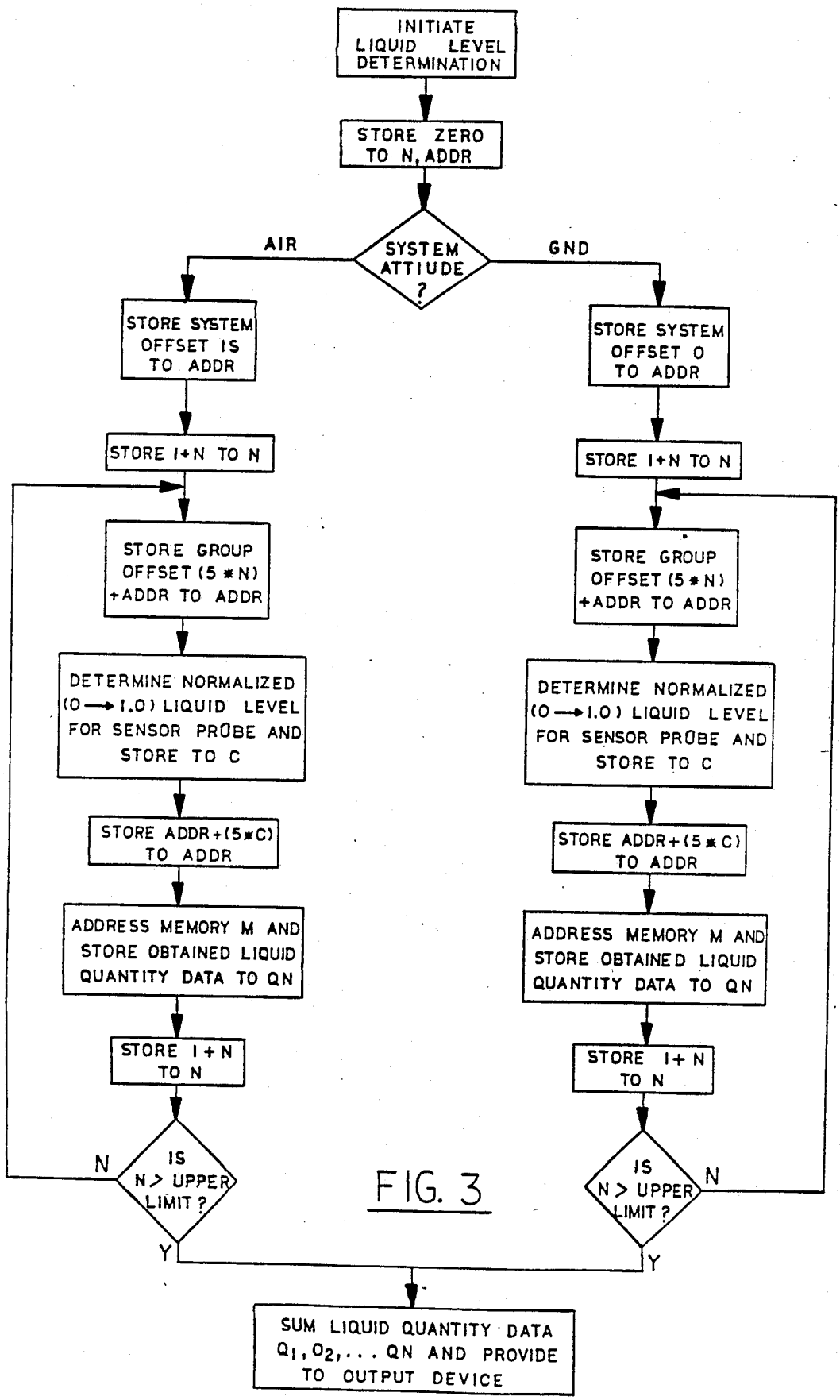
FIG. 3 is a flow diagram of the addressing sequence of the memory of FIG. 1.

In order to obtain fuel quantity information, the interrogation circuit of FIG. 1 provides an information value that is representative of the fraction of the sensor probe $S_n$ wetted by the liquid as disclosed in the above-incorporated application with this value combined with information representative of attitude of the fuel tank and the particular sensor probe $S_n$ to provide an address for the memory M and provide the desired liquid level output information in accordance with the flow diagram of FIG. 3. As shown therein, the sequence is initiated by storing the value zero to variables N and ADDR. A query is then presented as to the system attitude and where the system attitude, in the context of the best mode, indicates an airborne attitude, the sequence branches to the leftward operational path. Conversely, where the system attitude is ground based, the sequence branches to the rightward operational path. Assuming that the system is in an airborne attitude, the system memory offset of fifteen is added to the variable ADDR. Thereafter the variable N is incremented and an address group offset that is a function of the sensor probe number and the number of address locations in each group (i.e., five) is added to the variable ADDR. The fraction of the N th sensor probe wetted by the liquid is then determined (or recalled from a memory location) and multiplied by the number of address locations in the group with the result added to variable ADDR. The resulting cumulative address variable is then used to address the memory M and the readout liquid quantity information stored to a variable $Q_n$. By way of example for the sensor probe $S_2$ in an airborne attitude with 0.8 of the sensor probe $S_2$ wetted, the desired address is $15+(5*2)+(5*0.8)=28$, this address providing a liquid quantity indication $Q_2$ of six (FIG. 2). After the liquid quantity indications $Q_1$, $Q_2$, and $Q_3$ are obtained for the various sensor probes $S_n$, the values are summed to provide a signal for the output device.

The sequence of FIG. 3 thus advantageously provides an instruction sequence for obtaining fuel quantity information as a function of summed value of the system offset, the sensor probe offset, and a value representative of the number of address locations in each address group multiplied by the wetted fraction of the sensor probe.

The memory topology shown in FIG. 2 is illustrative only and, for reasons of exposition, does not represent an actual memory topology. In actual practice, a several hundred or thousand contiguous memory address locations would be provided to store corresponding liquid level or quantity information so that fine gradations of liquid level or quantity information would be available for the smallest changes in the fractions of the sensor probe wetted by the liquid. If desired, where a numeric address is ascertained, as described above, and does not precisely correspond to an existing address, the next lower or higher address can be used or interpolation between tabular values used.

As can be appreciated, the present invention provides method and apparatus for the accurate determination of liquid quantities in a liquid containing tank where the relationship between liquid level and liquid quantity is non-linear and/or of a discontinuous nature and which the attitude of the liquid containing tank and probes can vary relative to the gravity vector.

Thus it will be appreciated from the above that as a result of the present invention, a highly effective Apparatus and Method for Determining Liquid Levels is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An apparatus for determining the quantity of a liquid in a liquid-containing tank, the tank having at least first and second attitudes relative to the gravity vector, comprising:

at least N liquid-level sensing probes in a liquid-containing tank, each probe having a first and at least a second probe-specific liquid-quantity profile for a first and at least a second attitude of the probe relative to the gravity vector;

means for determining a value representative of the fraction of each of said N probes immersed in the liquid;

memory means containing N and N' sets of M sequential storage locations containing liquid-quantity profile information for respective ones of said N liquid-level sensors for their respective first and second attitudes; and addressing means for addressing said memory means to determine liquid-quantity information for each of said N liquid-level sensing probes, said addressing means addressing said memory means at a specific probe-quantity address, said probe-quantity address being defined as a function of a first address offset representative of the first or second attitude of the tank, a second probe-specific address offset representative of a relative position of the probe in a series of N probes, and a third address offset representative of the fraction of a respective probe immersed in the liquid multiplied by the M sequential storage locations.

2. The apparatus for determining the quantity of a liquid in a liquid-containing tank of claim 1, further comprising:

accumulator means for summing the liquid quantity values for each of said addressed storage locations to determine said specific probe-quantity address.

3. An apparatus for determining the quantity of a liquid in a liquid-containing tank, the tank having at least first and second attitudes relative to the gravity vector, comprising:

at least N liquid-level sensing probes in a liquid-containing tank, each probe having a first and at least a second probe-specific liquid-quantity profile for a first and at least a second attitude of the probe relative to the gravity vector;

stored-program controlled processor means for determining a value representative of the fraction of each of said N probes immersed in the liquid; and memory means containing N and N' sets of M sequential storage locations containing liquid-quantity profile information for respective ones of said N liquid-level sensors for their respective first and second attitudes;

said processor means addressing said memory means to determine liquid-quantity information for each of said N liquid-level sensing probes, said processor means addressing said memory means at a specific probe-quantity address, said probe- quantity address being defined as a function of a first address offset representative of the first or second attitude of the tank, a second probe-specific address offset representative of a relative position of the probe in a series of N probes, and a third address offset representative of the fraction of a respective probe immersed in the liquid multiplied by the M sequential storage locations, said probe-quantity address being equal to the sum of said first, second, and third address offsets.

4. A method for determining the quantity of a liquid in a liquid-containing tank whereby the tank has at least first and second attitudes relative to the gravity vector and at least N liquid level sensing probes, comprising the steps of:

immersing a first and at least one other liquid-level sensing probe in a liquid-containing tank, each probe having a first and at least a second probe-specific liquid-quantity profile for a first and at least a second attitude of the tank;

determining a value representative of the fraction of each of said first and other probe immersed in the liquid;

storing liquid-quantity profile information in a memory for the first and the other liquid-level sensor for their respective first and second attitudes, the stored information arranged as first and second sets of first and second sets of liquid quantity profile information;

addressing the memory to sequentially determine liquid-quantity information for the first and the other liquid-level sensing probes, said liquid-quantity information for each of said respective probes being located at a probe-quantity address, said probe-quantity address being determined by the steps of:

determining a first address offset representative of the first or second attitude of the tank, determining a second probe-specific address offset specific to the first or other probe, determining a third address offset representative of the fraction of a respective probe immersed in the liquid multiplied by the M sequential storage locations, and summing the first, second, and third address offsets; and summing the liquid-quantity information from the first and other liquid-level sensing probes.

* * * * *